United States Patent
Clough

(10) Patent No.: US 7,264,313 B2
(45) Date of Patent: Sep. 4, 2007

(54) SEAT HEADREST

(76) Inventor: Robert Clough, 26943 Reuther Avenue R, Santa Clarita, CA (US) 91351

( * ) Notice: Subject to any disclaimer, the term of this patent is extended or adjusted under 35 U.S.C. 154(b) by 0 days.

(21) Appl. No.: 11/595,287

(22) Filed: Nov. 9, 2006

(65) Prior Publication Data

US 2007/0108827 A1 May 17, 2007

Related U.S. Application Data

(63) Continuation-in-part of application No. 10/856,232, filed on May 27, 2004, which is a continuation-in-part of application No. 10/744,808, filed on Dec. 22, 2003, now Pat. No. 7,040,705, which is a continuation-in-part of application No. 10/172,477, filed on Jun. 14, 2002, now Pat. No. 6,666,517, which is a continuation-in-part of application No. 09/886,924, filed on Jun. 20, 2001, now Pat. No. 6,467,846, which is a continuation-in-part of application No. 09/665,992, filed on Sep. 20, 2000, now Pat. No. 6,250,716.

(51) Int. Cl.
*A47C 7/38* (2006.01)
(52) U.S. Cl. .................. 297/407; 297/406; 297/409
(58) Field of Classification Search ............. 297/391, 297/406, 407, 408, 409
See application file for complete search history.

(56) References Cited

U.S. PATENT DOCUMENTS

| 544,106 | A | * | 8/1895 | Mann | 297/407 |
|---|---|---|---|---|---|
| 937,343 | A | * | 10/1909 | Wallace | 297/407 |
| 4,205,878 | A | * | 6/1980 | Wooten | 297/391 |
| 6,120,099 | A | * | 9/2000 | Reiker.ang.s et al. | 297/391 |
| 6,305,749 | B1 | * | 10/2001 | O'Connor et al. | 297/397 |
| 6,607,242 | B2 | * | 8/2003 | Estrada et al. | 297/216.12 |
| 6,666,517 | B2 | * | 12/2003 | Clough | 297/410 |
| 7,144,083 | B2 | * | 12/2006 | List et al. | 297/391 |
| 7,201,448 | B2 | * | 4/2007 | Williamson et al. | 297/407 |
| 2003/0178880 | A1 | * | 9/2003 | Hannah | 297/406 |

* cited by examiner

*Primary Examiner*—Peter R. Brown
(74) *Attorney, Agent, or Firm*—James E. Brunton, Esq.

(57) ABSTRACT

An adjustable headrest for use with furniture and vehicle seats that includes novel slide mechanisms for permitting easy vertical and horizontal adjustments of the headrest relative to the seat. The headrest also includes wing-like side support members that are pivotally connected to horizontally adjustable slide mechanisms by constant torque hinges. Additionally, the headrest includes a mechanism for permitting pivotal movement of the entire headrest relative to the seat connector which connects the headrest to the seat.

20 Claims, 16 Drawing Sheets

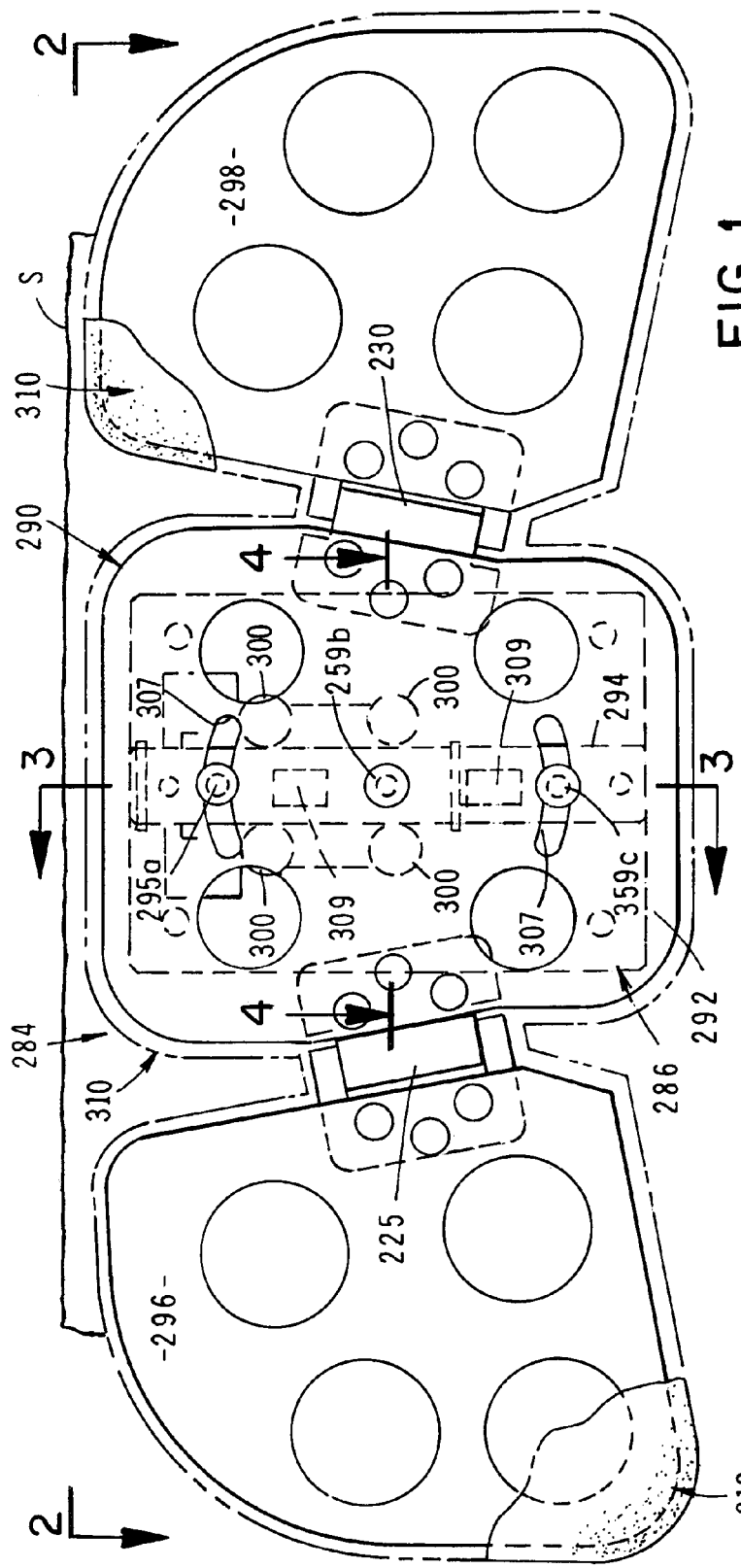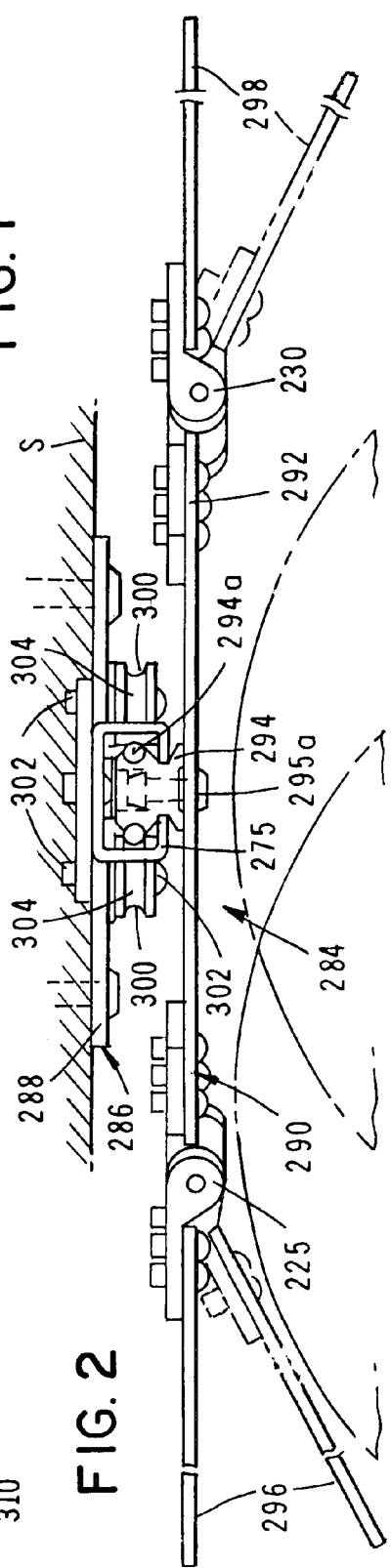
FIG. 1
FIG. 2

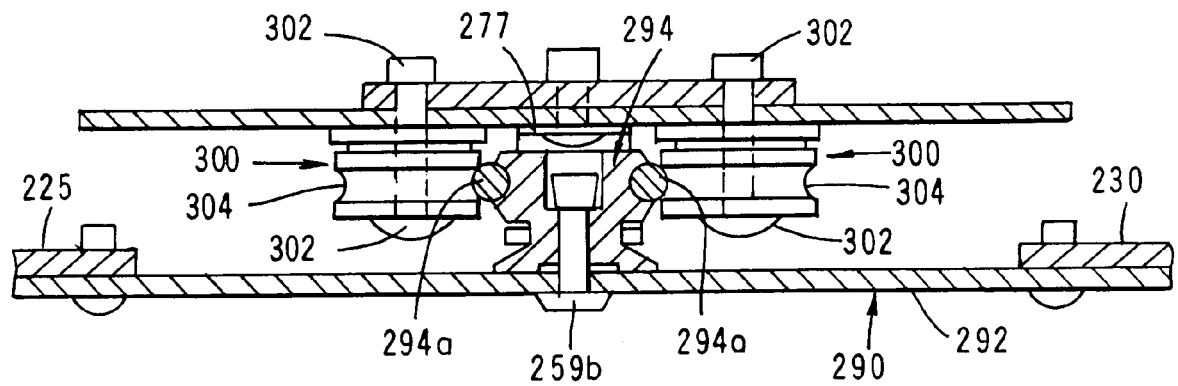
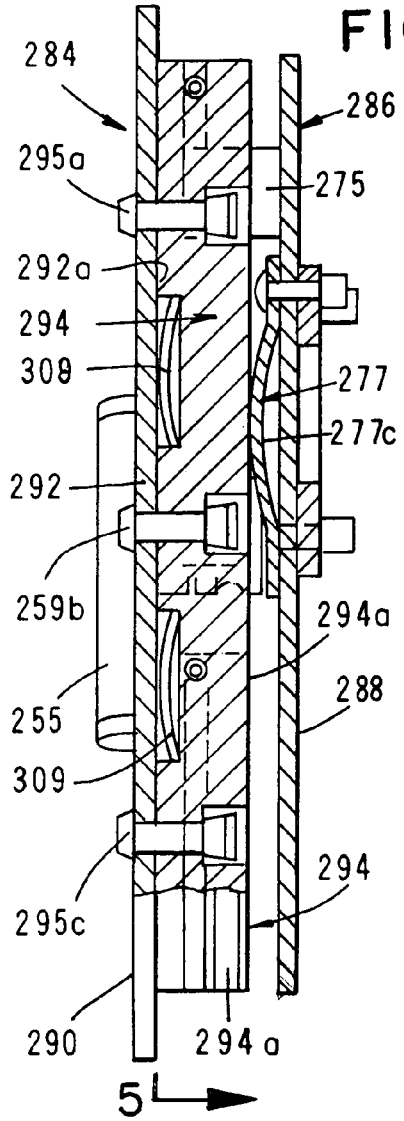
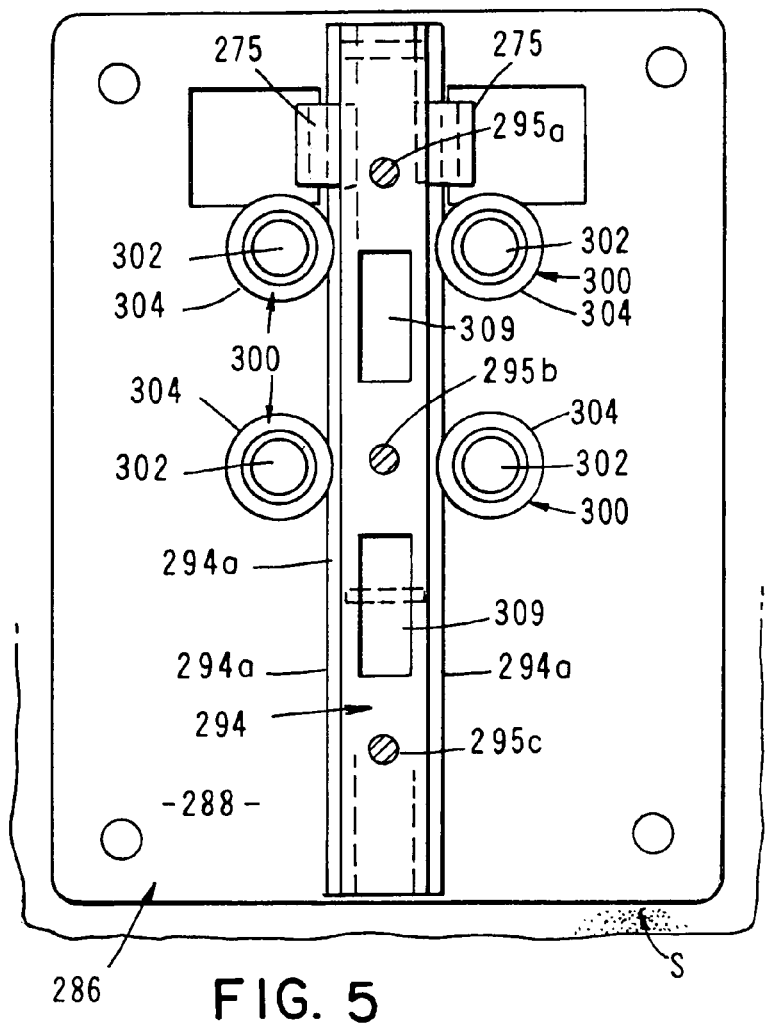

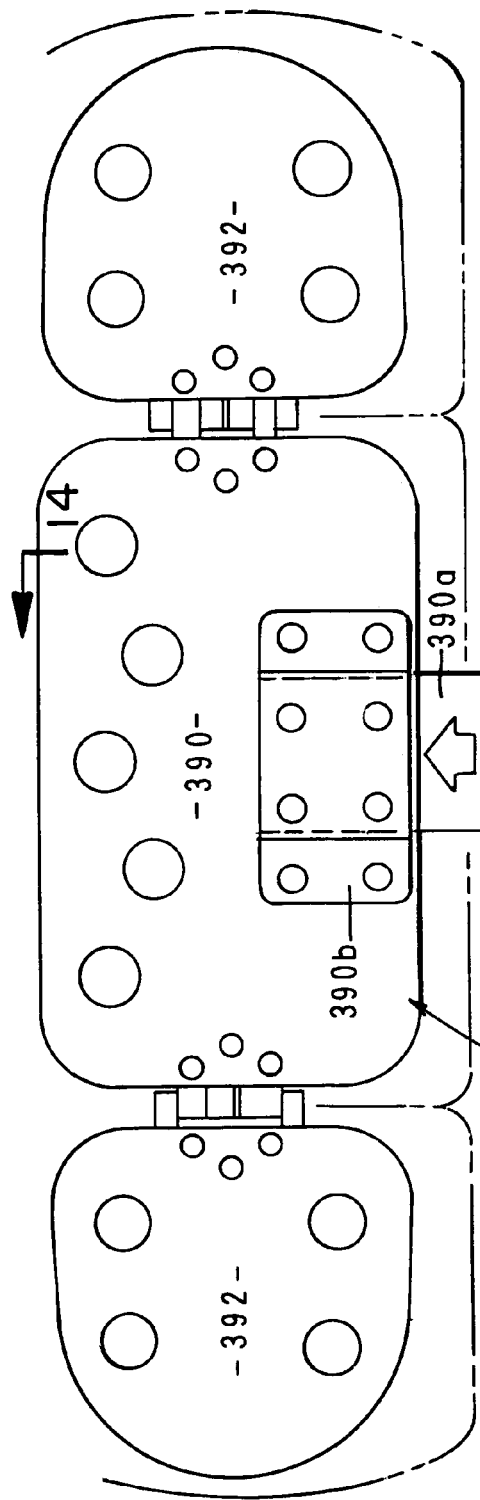
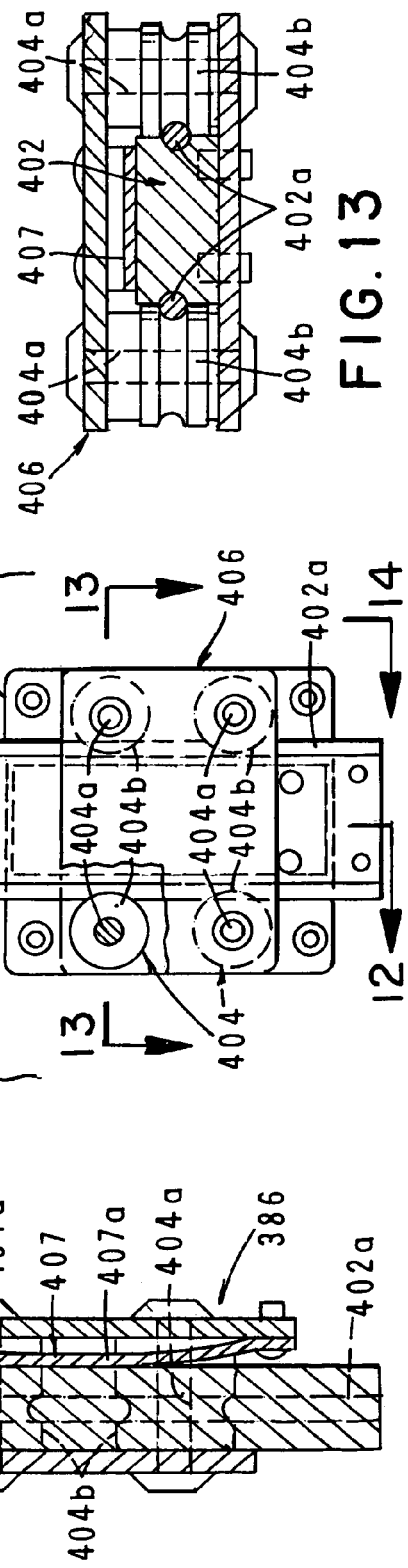
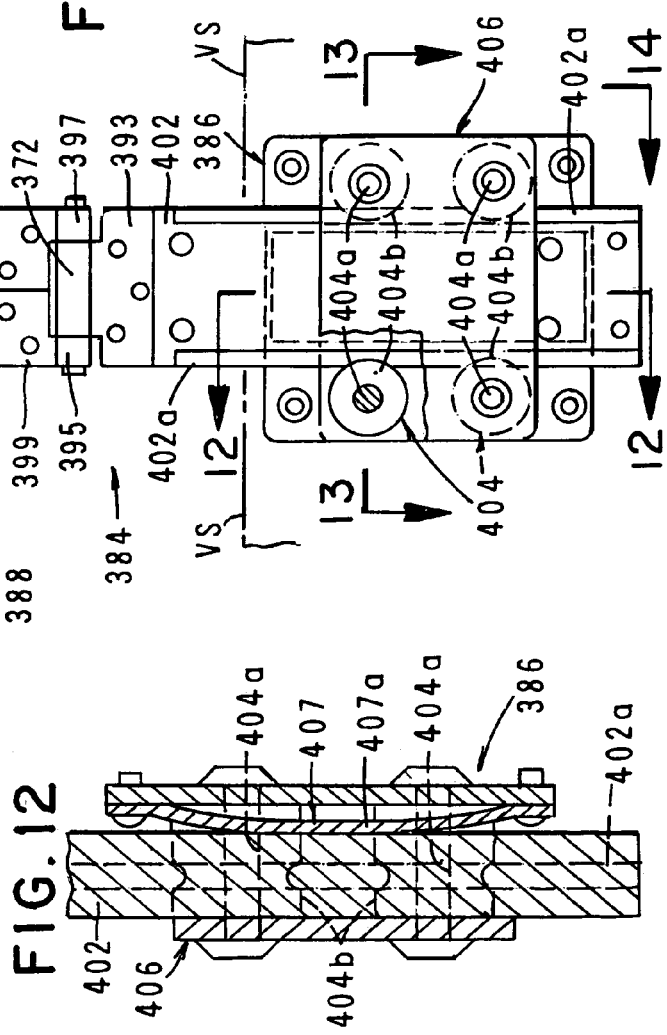

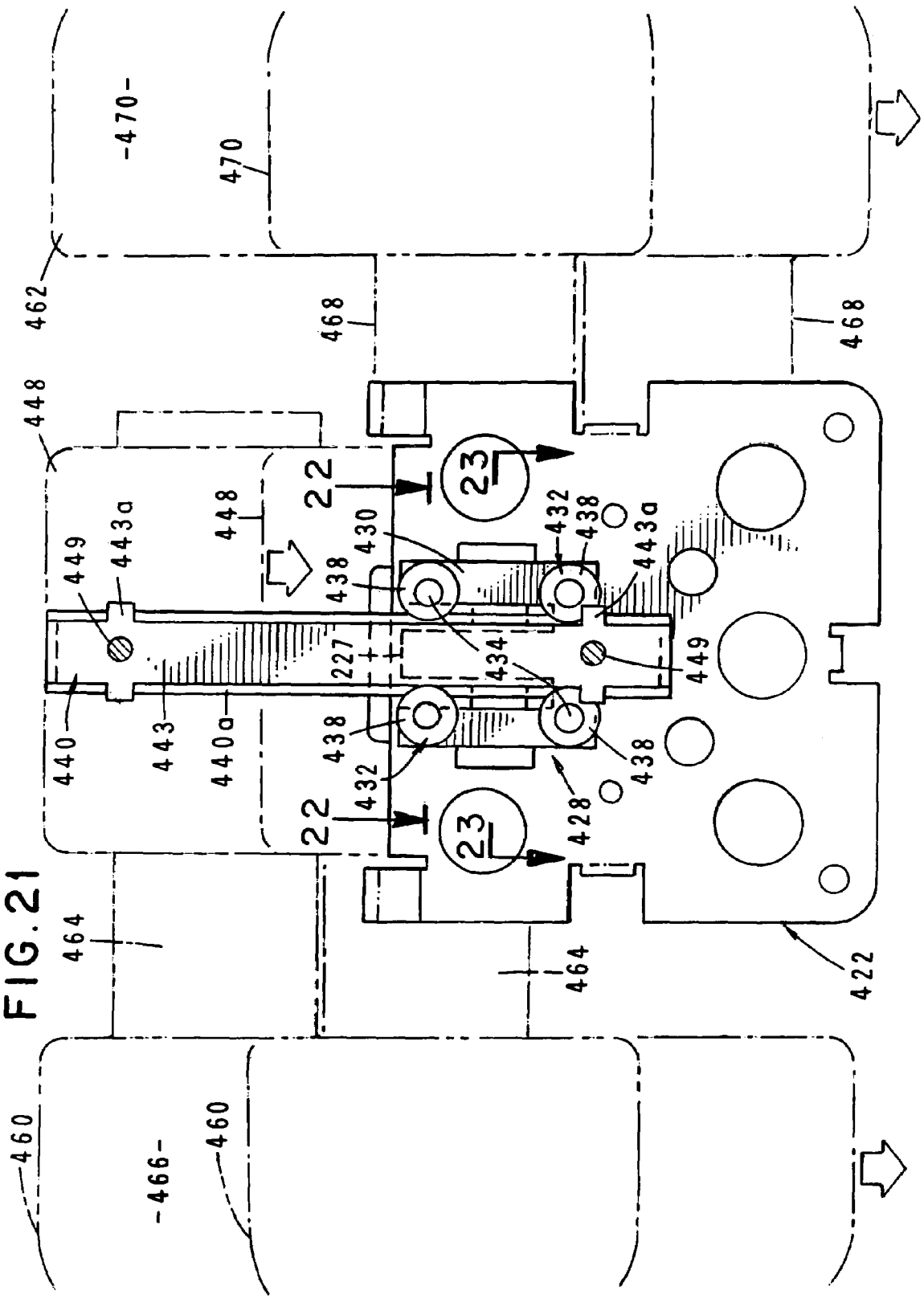

SEAT HEADREST

This is a Continuation-In-Part application of application Ser. No. 10/856,232 filed May 27, 2004 which is a Continuation-In-Part application of application Ser. No. 10/744, 808, filed Dec. 22, 2003 now U.S. Pat. No. 7,040,705, which is a Continuation-In-Part application of application Ser. No. 10/172,477, filed Jun. 14, 2002, now U.S. Pat. No. 6,666, 517, which is a Continuation-In-Part application of application Ser. No. 09/886,924, filed Jun. 20, 2001, now U.S. Pat. No. 6,467,846, which is a Continuation-In-Part of application Ser. No. 09/665,992, filed Sep. 20, 2000, now U.S. Pat. No. 6,250,716.

BACKGROUND OF THE INVENTION

1. Field of the Invention

The present invention relates generally to headrests for seats. More particularly, the invention concerns a fully adjustable headrest for use in connection with furniture and with passenger vehicles such as aircraft, trains and busses.

2. Discussion of the Prior Art

Various types of headrests for use in passenger vehicles have been suggested in the past. As the general rule, these headrests are designed primarily to satisfy safety aspects rather than to provide a comfortable seating posture. Typically, the prior art vehicle headrests comprise only a vertically adjustable head support member designed to provide protection against injury in the event of an accident. However, some vehicle headrests have also been provided with lateral headrest elements. Exemplary of such a headrest is that described in U.S. Pat. No. 5,997,091 issued to Rech, et al.

In addition to passenger vehicle headrests, a number of headrests have been designed for use in emergency vehicles. These types of headrests are of a more complicated design and some include greater adjustability features. Exemplary of these types of headrests are those disclosed in U.S. Pat. No. 5,275,462 and in U.S. Pat. No. 5,934,749 both issued to Pond, et al.

Even more complex headrests have been designed for use in military aircraft and, more particularly, in military aircraft for use in conjunction with ejection seats. Typical of this class of headrest design are those disclosed in U.S. Pat. No. 4,883,243 and U.S. Pat. No. 4,899,961 both issued to Herndon. Another such headrest design is disclosed in U.S. Pat. No. 4,466,662 issued to McDonald, et al.

In addition to the development of headrests for use in military aircraft, significant advances have been made in recent years in the design of headrests for use in commercial aircraft. Many of these headrests are designed for personal comfort and include pivotally movable back and lateral supports. In these latter types of headrests, the head support members are typically slidably mounted on spaced-apart rods that extend upwardly from the back of the seat and rely on friction to maintain the headrest in an elevated position.

As will become clear from the discussion that follows, the headrests of the present invention represents a substantial improvement over the prior art headrests provide significantly greater adjustability and, therefore, greater support and comfort to the user.

SUMMARY OF THE INVENTION

It is an object of the present invention to provide an adjustable headrest that provides both support and comfort to the user and can be used in connection with furniture including household and office furniture and also in connection with various types of passenger vehicles.

Another object of the invention is to provide a headrest of the aforementioned character that includes slide means for permitting easy height adjustment of the headrest.

Another object of the invention is to provide easily adjustable, wing-like, side support members that are pivotally connected to a horizontally adjustable member by means of constant torque hinges.

Another object of the invention is to provide a headrest of the aforementioned character that includes means for permitting pivotal movement of the entire headrest relative to the seat connector.

Another object of the invention is to provide a headrest as described in the preceding paragraph that is also slideably adjustable relative to the seat connector.

Another object of the invention is to provide a headrest construction of the class described that is of a simple construction and one that can be inexpensively produced and easily installed.

BRIEF DESCRIPTION OF THE DRAWINGS

FIG. 1 is a front view of one form of the headrest assembly of the present invention.

FIG. 2 is a cross-sectional view taken along lines 2-2 of FIG. 1.

FIG. 3 is an enlarged cross-sectional view taken along lines 3-3 of FIG. 1.

FIG. 4 is an enlarged cross-sectional view taken along lines 4-4 of FIG. 1.

FIG. 5 is a view taken along lines 5-5 of FIG. 3.

FIG. 11 is a greatly enlarged view taken along lines 11-11 of FIG. 10.

FIG. 12 is a greatly enlarged, cross-sectional view taken along lines 12-12 of FIG. 11.

FIG. 13 is a greatly enlarged, cross-sectional view taken along lines 13-13 of FIG. 11.

FIG. 21 is a view taken along lines 21-21 of FIG. 18.

FIG. 22 is an enlarged cross-sectional view taken along lines 22-22 of FIG. 21.

FIG. 23 is an enlarged cross-sectional view taken along lines 23-23 of FIG. 21.

FIG. 24 is a generally perspective, exploded view of the connector member, the first roller assembly and the elongated guide assembly of this latest form of the invention.

DESCRIPTION OF THE INVENTION

Figure 6:
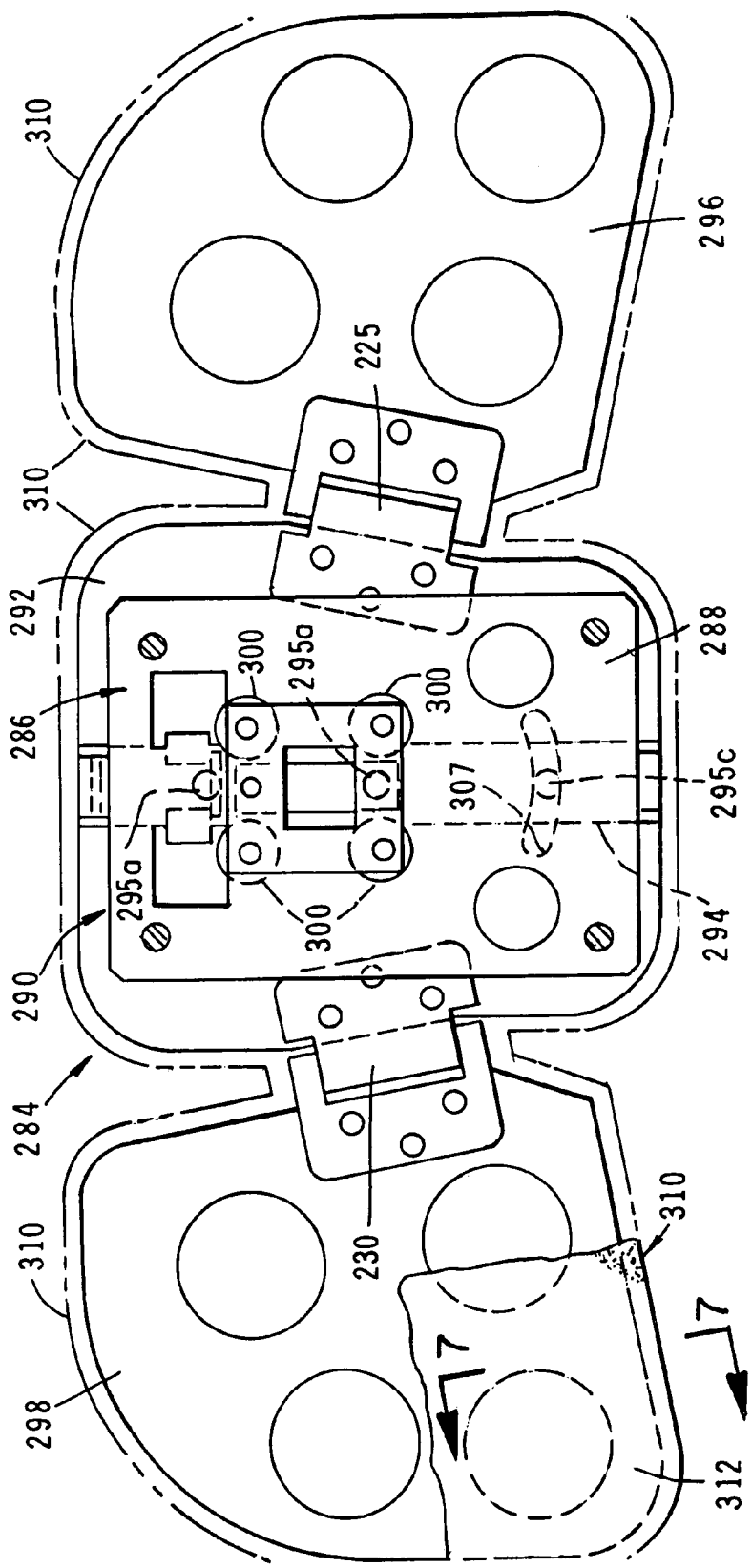
FIG. 6 is a rear view of the headrest assembly shown in FIG. 1.
Figure 7:
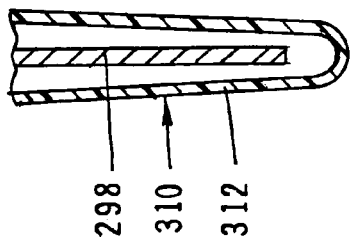
FIG. 7 is an enlarged, cross-sectional view taken along lines 7-7 of FIG. 6.

Referring to the drawings and particularly to FIGS. 1 through 9, one form of seat headrest of the invention is there illustrated and generally designated by the numeral 284. The seat headrest here comprises a generally planar first connector member 288 that is connected to the seat of the vehicle by any suitable means. A head support, or headrest assembly 290 is slidably connected to first connector member 288 for movement between a first lowered position shown in FIG. 1 and an upraised position shown in FIG. 9. As illustrated in FIG. 2, connector member 288 is disposed within a first plane generally parallel with the front surface of seat "S". As best seen in FIGS. 1 and 2, headrest assembly 290 includes a generally planar central support member or panel 292 to which an elongated guide member 294 is connected by means of connectors 295a, 295b and 295c (FIG. 1). As also illustrated in FIG. 2 support member 292 is disposed in a second plane generally parallel to the first plane of connector member 288. A first lateral or side panel 296 is pivotally connected to the central support member by means of a constant torque hinge 225. Also connected to central support panel 292 by a constant torque hinge 230 is a second lateral or side panel 298. As indicated by the phantom lines in FIG. 2, side panels 296 and 298 are pivotally movable, a first position shown by solid lines in FIG. 2 wherein they are substantially co-planar with central support panel 292 to a second angularly extending forward position shown by phantom lines in FIG. 2. When side panels 296 and 298 are pivoted into the angularly outwardly extending position, they provide a comfortable lateral support to the passenger's head in the manner previously described and as shown in FIG. 2.

The earlier identified elongated guide member 294 includes oppositely disposed guide rails 294a (FIGS. 2 and 5) that are adapted to be rollably engaged by two pairs of spaced-apart roller assemblies 300 that are mounted on connector member 288. The roller assemblies 300, each of which are of identical construction, include a connecting shaft 302 that is connected to connector member 288 and a grooved roller 304 that is rotatably mounted on shaft 302 (FIG. 2). With this construction, as depicted in FIG. 9, the headrest assembly 290 can be adjustably moved upwardly and downwardly relative to seat connector member 288 so as to enable the desired adjustment in the height of the headrest assembly relative to the seat connector member. As the headrest assembly is moved upwardly and downwardly, guide means, shown here as a pair of internal ears 275 formed on support member 288 (FIG. 2), slidably engage guide member 294 to guide the travel of the headrest assembly. With the construction shown in the drawings, as the headrest pivots and moves upwardly and downwardly, connector member 288 travels within the second plane (see FIGS. 8 and 9).

The present form of the invention also includes resistance imparting means for imparting resistance to the movement of head rest assembly 290 upwardly and downwardly relative to connector member 288. This resistance imparting means comprises a uniquely configured leaf spring designated in the drawings by the numeral 277. When the headrest assembly of the invention is fully assembled, central portion 277c of the spring is in pressural engagement with the front surface, or face, 294a of guide 294 (FIG. 3). With this construction, as the headrest assembly is moved upwardly and downwardly spring 277 will yieldably resist sliding movement of headrest assembly 290 relative to elongated guide 294 and seat connector member 288.

Figure 8:
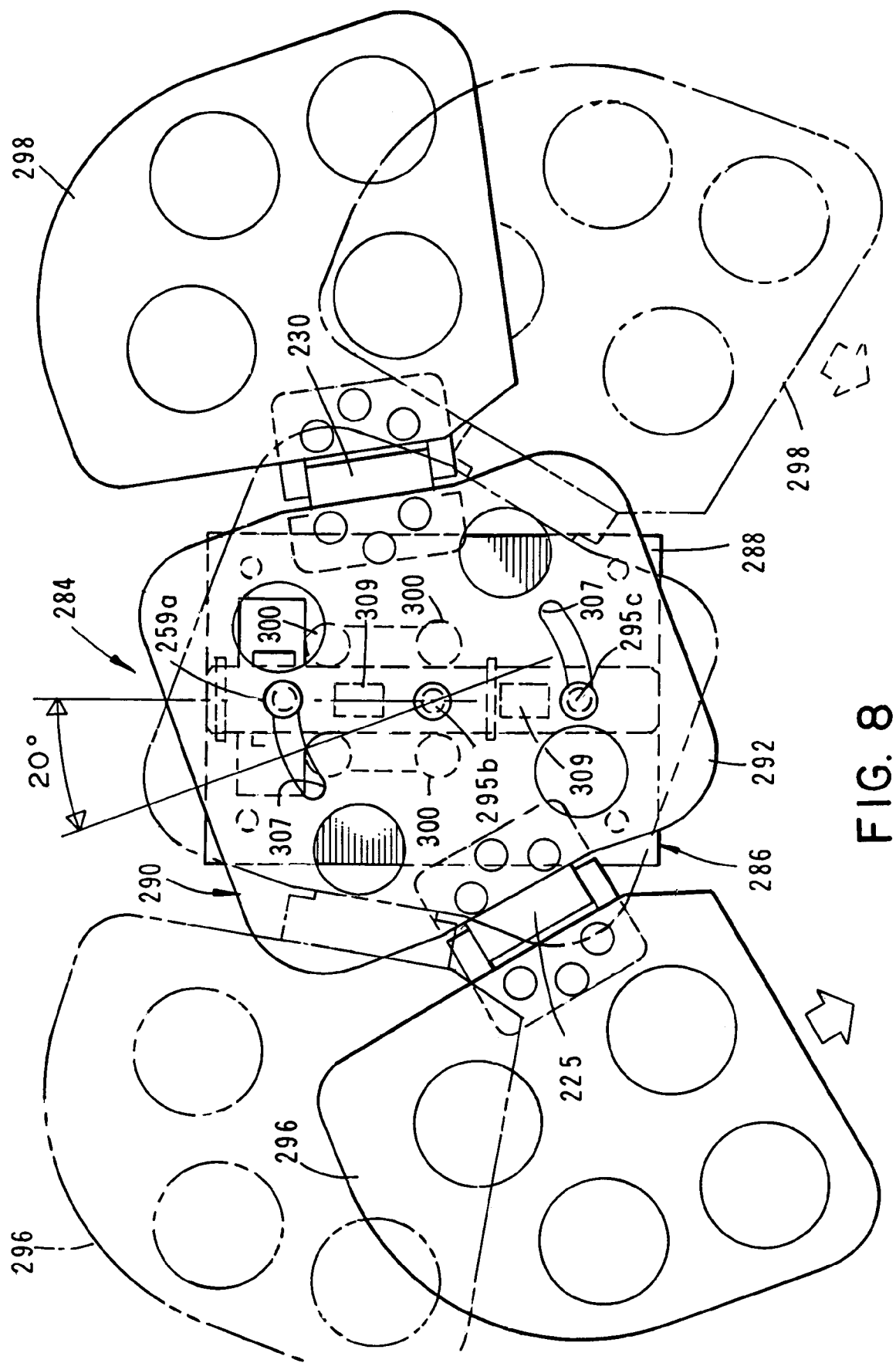
FIG. 8 is a front view similar to FIG. 1 illustrating the pivotal movement of the headrest relative to the mounting component.
Figure 9:
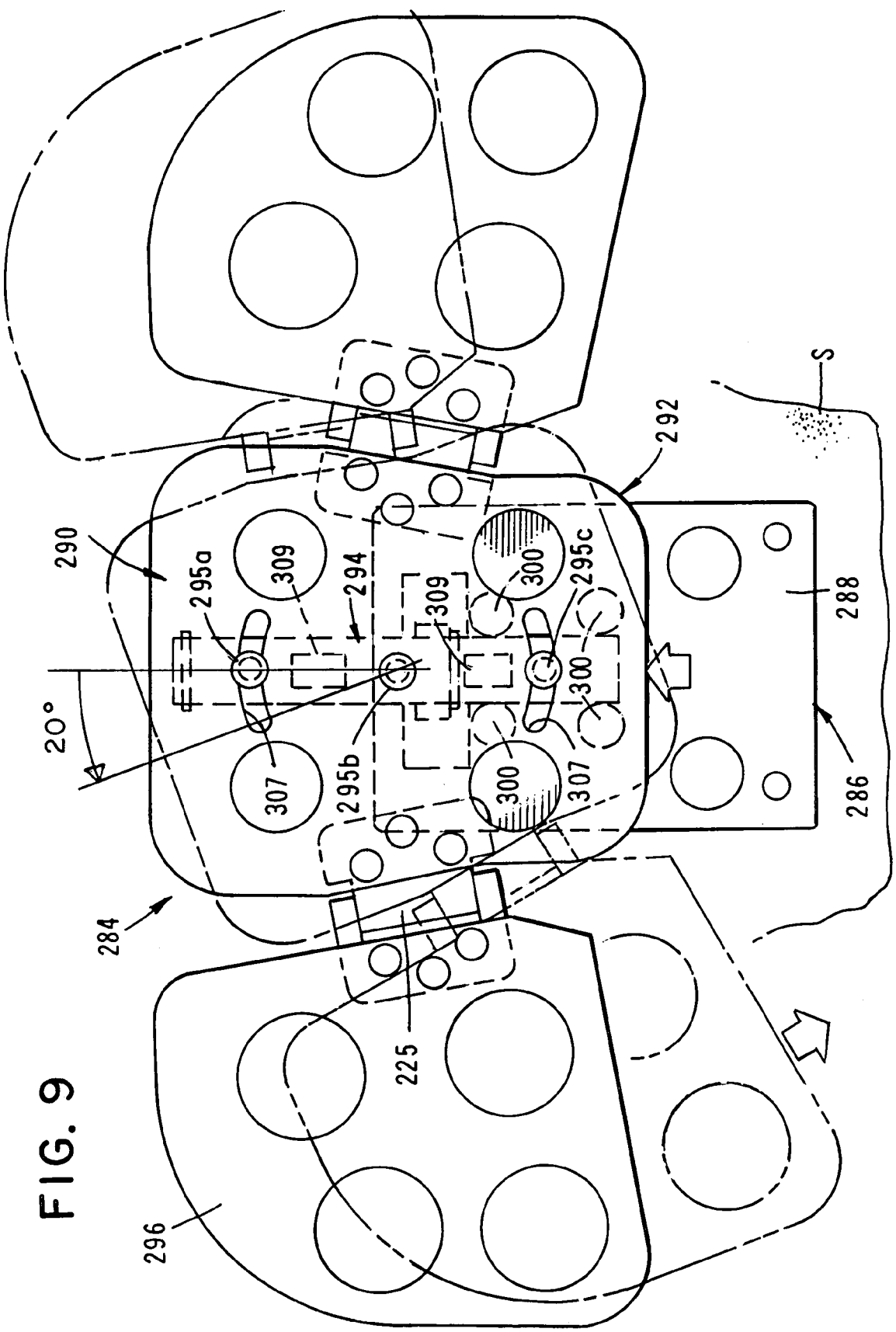
FIG. 9 is a front view similar to FIG. 8, further illustrating the pivotal movement of the headrest relative to the mounting component.

An important feature of the invention resides in the fact that the entire headrest assembly 290 is pivotally movable relative to guide 294 and relative to seat connector 288 from the first position shown in FIG. 6 to the second position shown by the solid lines in FIG. 8 and to the third position shown by the phantom lines in FIG. 8. More particularly, as illustrated in FIGS. 8 and 9, the entire headrest assembly 290 can be pivoted about connector member 295b through an angle of approximately 20 degrees. As the headrest assembly is so pivoted, connector members 295a and 295c travel within generally arcuate-shaped slots 307 formed in plate 292. With this unique construction, the headrest assembly can be selectively positioned so that the passenger can comfortably rest his or her head on a selected one of the angularly inclined side wings 296 and 298.

As best seen in FIG. 3, a second resistance imparting means is provided to frictionally resist arcuate movement of the headrest assembly. This second resistance imparting means here comprises a plurality of spaced-apart, uniquely configured leaf springs designated in the drawings by the numeral 309. When the headrest assembly of the invention is fully assembled, the central portions of these springs are in pressural engagement with the rear surface 292a of central panel 292 in the manner best seen in FIG. 3. With this construction, as the headrest assembly is pivoted about connector 295b, springs 309 will yieldably resist sliding movement of headrest panel 292 relative to elongated guide 294 and thereby ensure smooth arcuate travel of the headrest assembly.

Headrest assembly 290 also uniquely incorporates massage systems generally designated in the drawings by the numeral 310. These systems, which are commercially available from Inseat Solutions, LLC of Costa Mesa, Calif., include An Electronic Vibratory System 312 of the character manufactured and sold by Cascade Designs, LTD of Seattle, Wash. As indicated in the drawings, these novel massage systems are affixed to and encompass the central and side panels of the headrest assembly (see particularly FIG. 7). When the massage systems are affixed to the headrest they can be operated by the passenger as desired to provide a stimulating and satisfying massage.

Turning next to FIGS. 10 through 16, still another form of seat headrest of the invention is there illustrated and generally designated by the numeral 384. This latest embodiment of the invention is also similar in some respects to the earlier described embodiment of the invention and like numerals are used in FIGS. 10 through 16 to identify like components. The primary difference between this latest embodiment of the invention and that earlier described resides in the fact that this latest seat headrest of the invention is specifically designed for use in connection with passenger vehicles such as automobiles and trucks.

Figure 10:
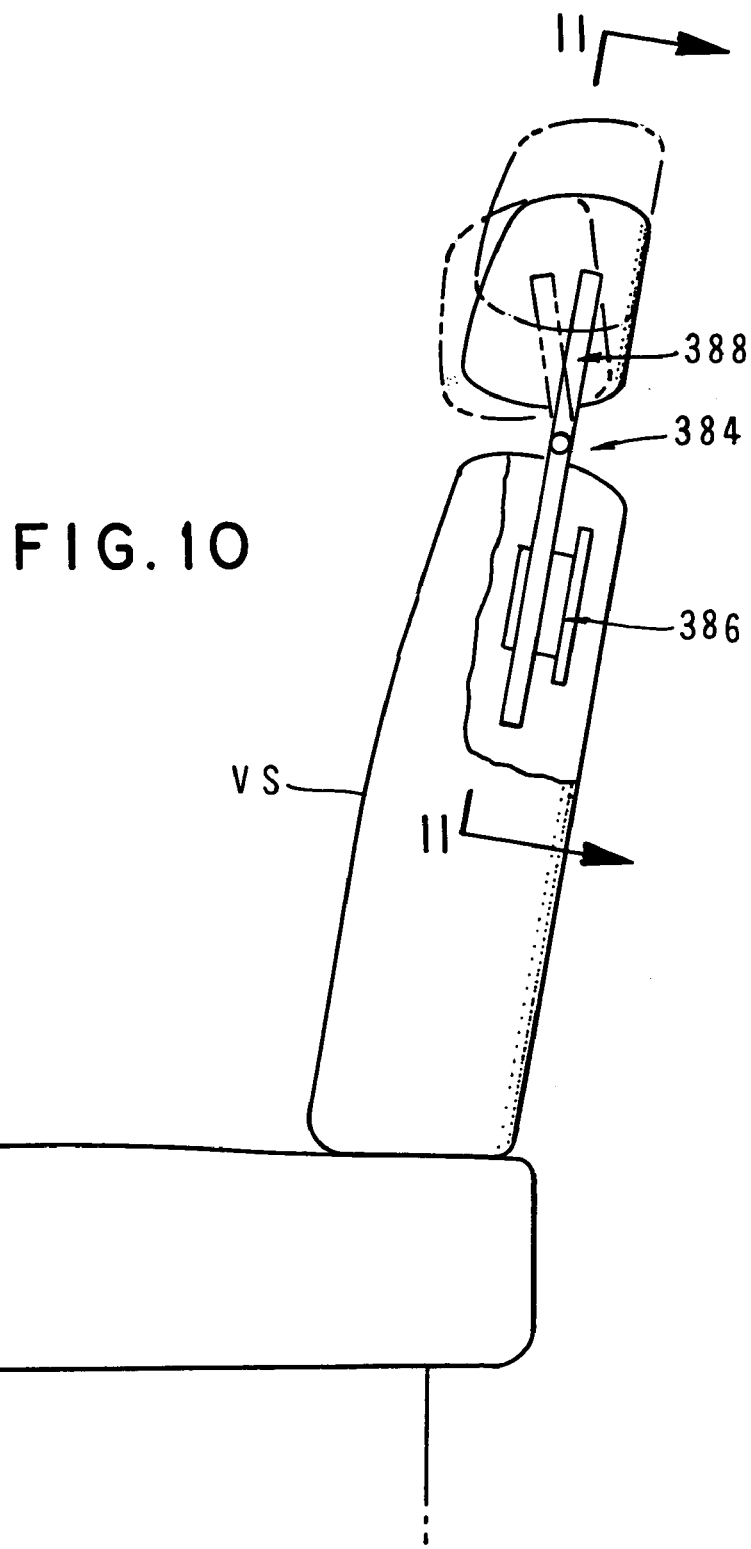
FIG. 10 is a side elevational view, partly broken away to show internal construction, of yet another form of the seat headrest of the present invention that is especially adapted for use in connection with automobiles and like vehicles.
Figure 14:
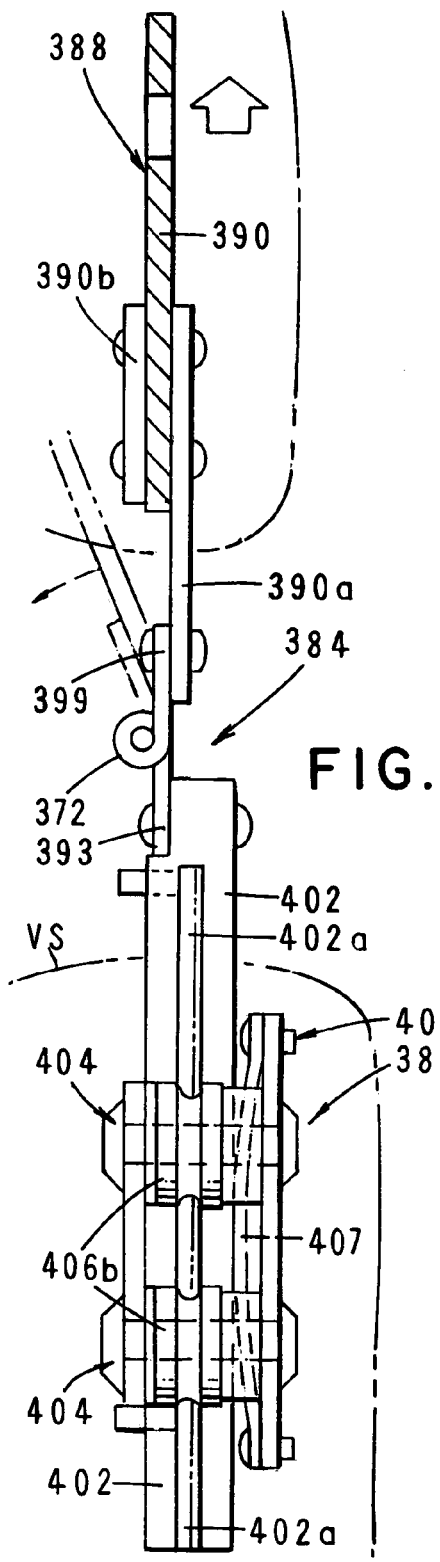
FIG. 14 is an enlarged, cross-sectional view taken along lines 14-14 of FIG. 11.
Figure 15:
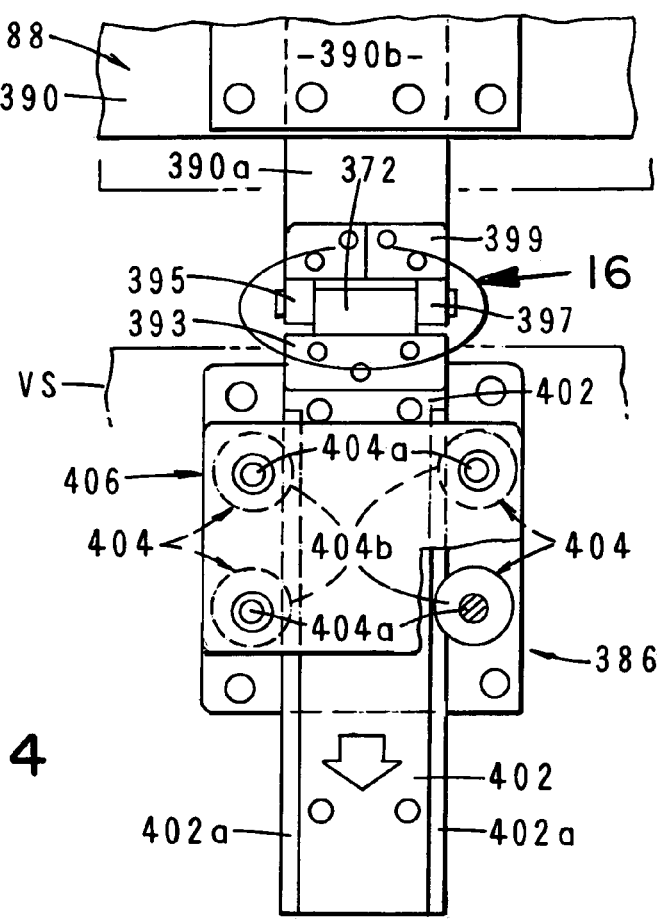
FIG. 15 is a fragmentary front view, partly broken away to show internal construction of the seat connector portion of the seat headrest of this latest form of the invention.

As shown in FIGS. 10 and 11, the seat headrest of this latest embodiment of the invention comprises a seat connector assembly 386, which is connected to the vehicle seat "VS" and a headrest connector assembly 388 which is vertically spaced from the seat connector assembly and is pivotally connected thereto by a connector plate 390*a* the upper end of which is connected to panel 390 by a connector bracket 390*b* (FIG. 11). The headrest assembly 388 here comprises a central support panel 390 and a pair of generally planar side panels 392 which are connected to the central panel by hinge means, or constant torque hinges. With the construction shown in the drawings, the side panels 392 are pivotally movable from a substantially co-planar position with central support panel 390 to an angularly outwardly extending position. When the side panels are pivoted into the angularly outwardly extending position, they provide a comfortable lateral support to the passenger's head.

Figure 16:
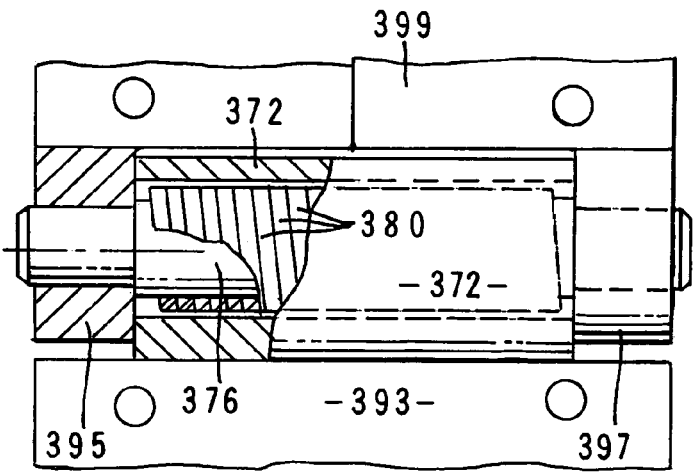
FIG. 16 is a greatly enlarged view, partly broken away to shown internal construction, of the area designated by the numeral 16 in FIG. 15.

As previously mentioned, the headrest connector assembly 388 is pivotally connected to the seat connector assembly 386 by hinge means so that the headrest connector assembly can be readily adjusted forwardly and rearwardly in the manner shown in FIG. 10. As illustrated in FIG. 16 this hinge means comprises a barrel portion 372 connected to one leaf 393 of the hinge assembly, a shaft 376 rotatably carried by the barrel portion 376 and a plurality of generally U-shaped, friction imparting clips 380 which circumscribe the barrel portion and are of the configuration shown in the drawings. As shown in FIG. 16, the ends of the shaft are received within first and second connector segments 395 and 397 which are connected to leaf 399 of the hinge assembly. Leaf 393 is affixed to an elongated guide 402, which forms a part of seat connector assembly 386, while leaf 399 is affixed to connector plate 390*a* of headrest connector assembly 388.

Elongated guide 402 includes oppositely disposed guide rails 402*a* (FIG. 15) that are adapted to be rollably engaged by two pairs of spaced-apart roller assemblies 404 that are mounted on a carriage assembly 406. The roller assemblies 404, each of which are of identical construction, include a threaded connecting shaft 404*a* that is threadably connected to carriage assembly 406 and a grooved roller 404*b* that is rotatably mounted on shaft 404*a*. With this construction, carriage assembly 406 along with headrest assembly 388 can be adjustably moved upwardly and downwardly so as to enable the desired adjustment in the height of the headrest assembly relative to the vehicle seat back.

Also forming and important aspect of the headrest assembly of this latest form of the invention is resistance imparting means for imparting resistance to the movement of headrest assembly upwardly and downwardly relative to the vehicle seat back. As before, this novel resistance imparting means comprises a uniquely configured leaf spring designated in the drawings by the numeral 407. As best seen in FIG. 12, spring 407 includes a central portion 407*a* that engages the back surface of guide 402 in the manner shown in the drawings. As the headrest assembly is moved upwardly and downwardly, spring 407 will yieldably resist sliding movement of carriage assembly relative to guide 402.

Referring to FIGS. 17 through 29, another form of seat headrest of the invention is there illustrated. This latest embodiment of the invention is similar in some respects to the previously illustrated embodiments of the invention and like numerals are used in FIGS. 17 through 29 to identify like components. The primary difference between this latest embodiment of the invention and those previously described, resides in the fact that not only is the slightly differently configured headrest assembly vertically movable relative to the seat connector assembly, but the side panels of the headrest assembly are simultaneously movable transversely relative to the central head support panel of the assembly.

Figure 17:
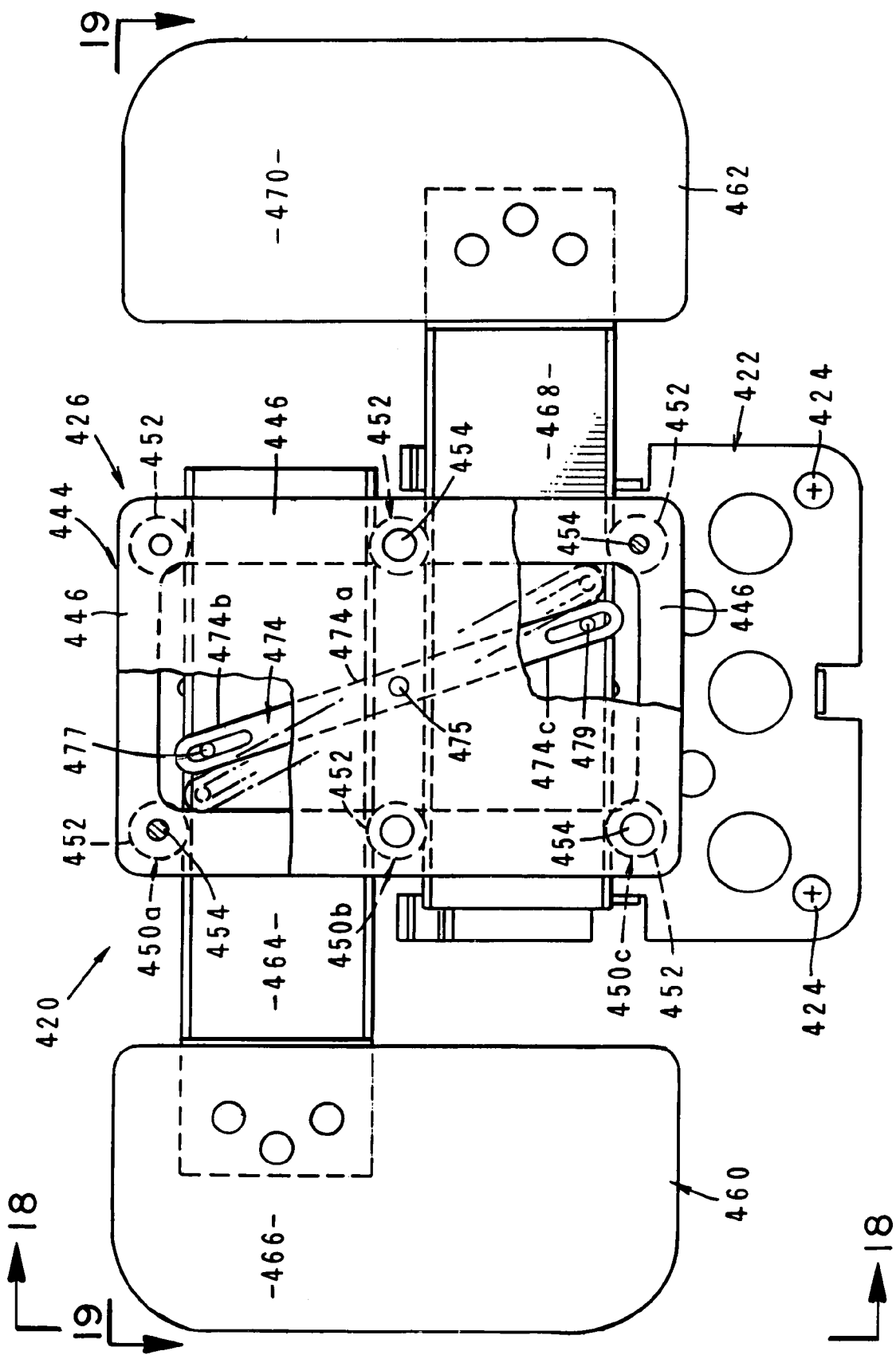
FIG. 17 is a front view of yet another form of the headrest assembly of the present invention.
Figure 18:
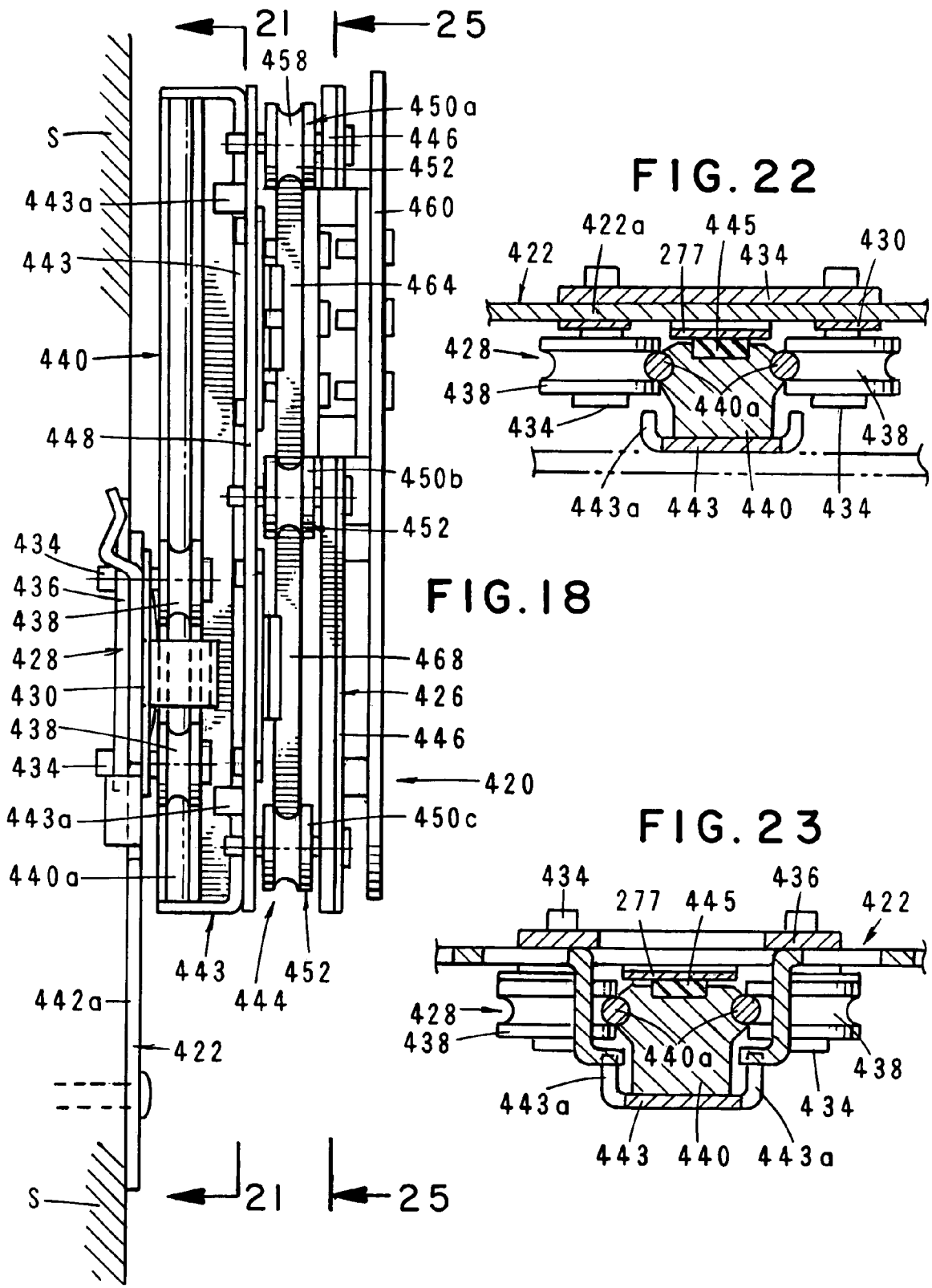
FIG. 18 is a view taken along lines 18-18 of FIG. 17.
Figure 19:
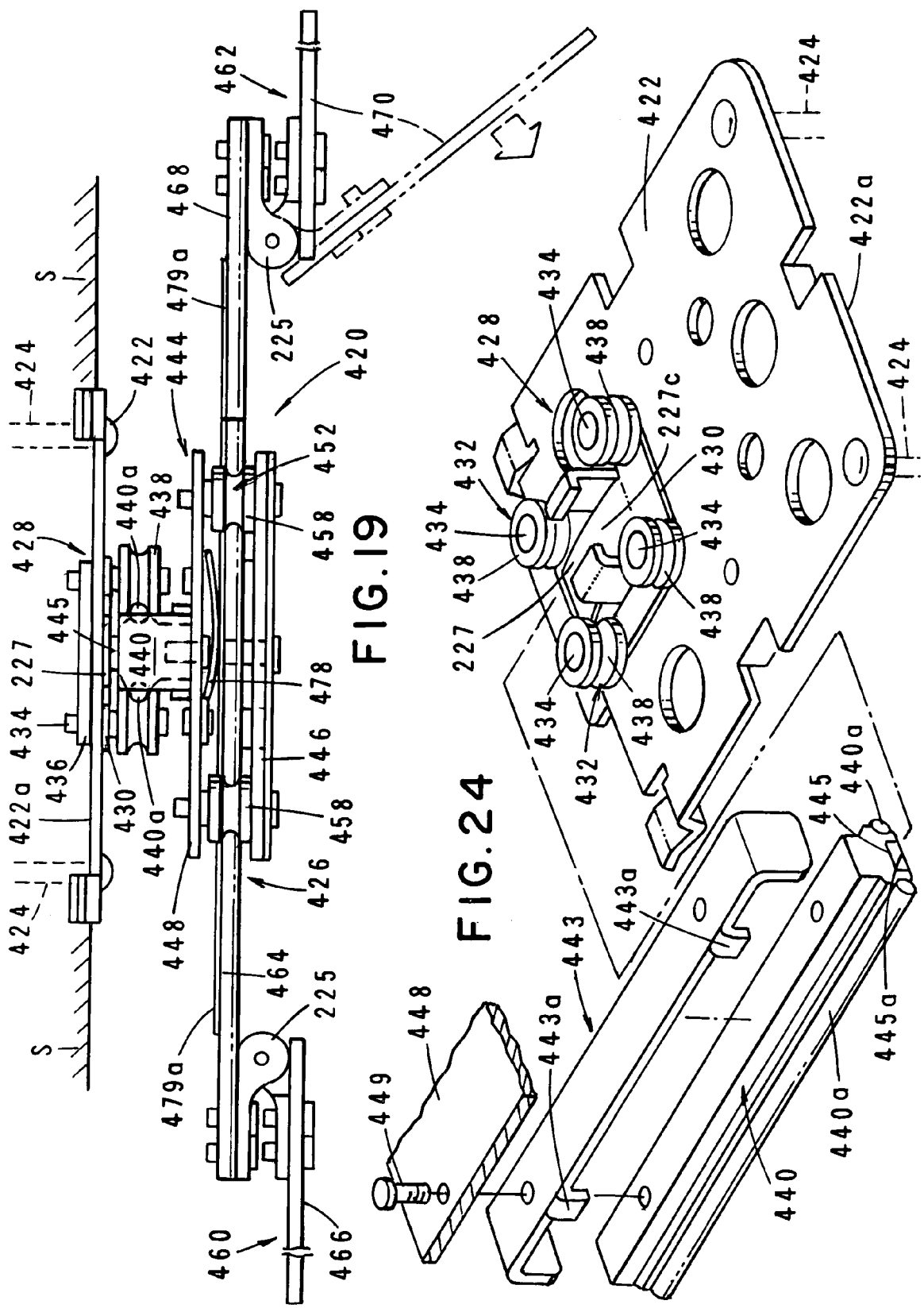
FIG. 19 is a view taken along lines 19-19 of FIG. 17.

Turning particularly to FIGS. 17 and 18, the seat headrest of this latest form of the invention, which is generally designated by the numeral 420, can be seen to comprise a generally planar seat connector member 422 that is connected to the vehicle seat "S" (FIG. 18) by suitable connectors 424. The differently configured headrest assembly 426 of this latest form of the invention is slidably connected to connector member 422 for movement between a lowered position and an upraised position. In this regard, a first roller module 428 is connected to connector member 422 in the manner best seen in FIG. 19. First roller module 428 here comprises a first base plate 430 to which two pairs of spaced-apart roller assemblies 432 are mounted. The roller assemblies 432, which are of identical construction, include a connecting shaft 434 that extends through connector member 422 and is connected to a second base plate 436 disposed in engagement with the inner surface 422*a* of connector member 422 (FIG. 19). Each of the roller assemblies 432 also includes a grooved roller 438 that is rotatably mounted on shaft 434 (FIGS. 19 and 24).

Figure 20:
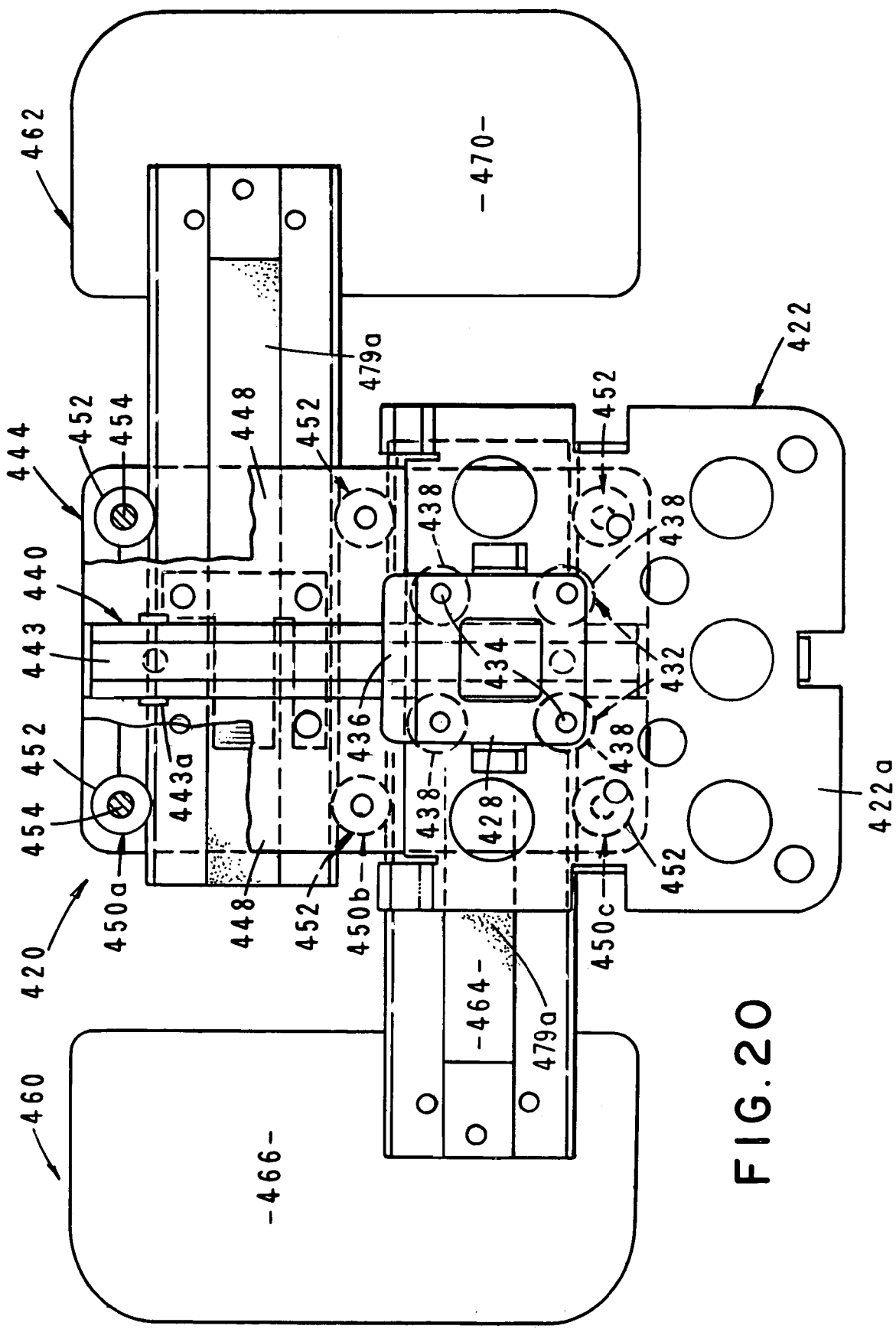
FIG. 20 is a rear view of the headrest assembly shown in FIG. 17.

As best seen in FIGS. 19 and 20, the two pair of spaced-apart roller assemblies 432 are adapted to rollably engage the oppositely disposed guide rails 440*a* of an elongated guide 440 that is connected to a novel second roller module 444 that forms a part of the differently configured headrest assembly 426 of this latest form of the invention. With the construction thus described, headrest assembly 426 can be adjustably moved upwardly and downwardly relative to seat connector member 422 so as to enable the desired adjustment in the height of the headrest assembly relative to the seat connector member. As the headrest assembly is moved upwardly and downwardly, guide means, shown here as two pair of ears 443*a* formed on a support member 443 (FIG. 24), slidably engage guide member 440 to guide the travel of the headrest assembly.

Figure 26:
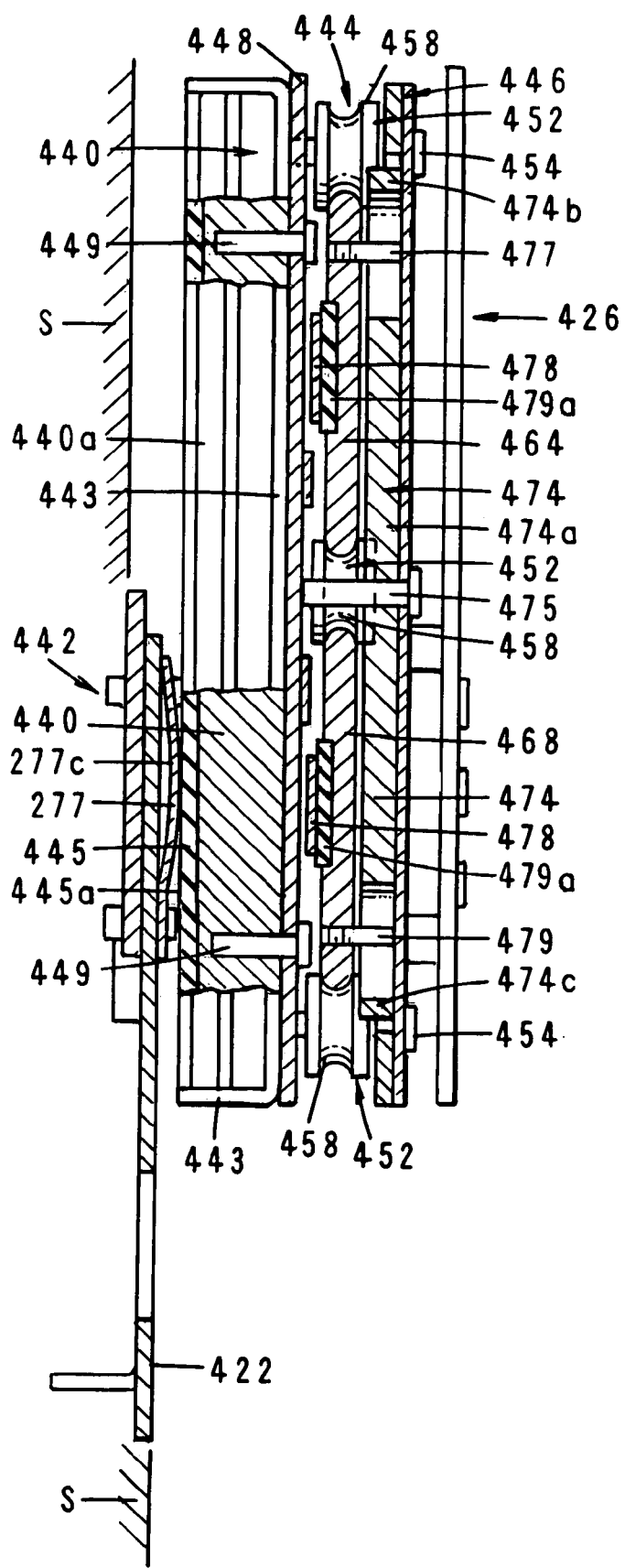
FIG. 26 is a cross-sectional view taken along lines 26-26 of FIG. 25.
Figure 28:
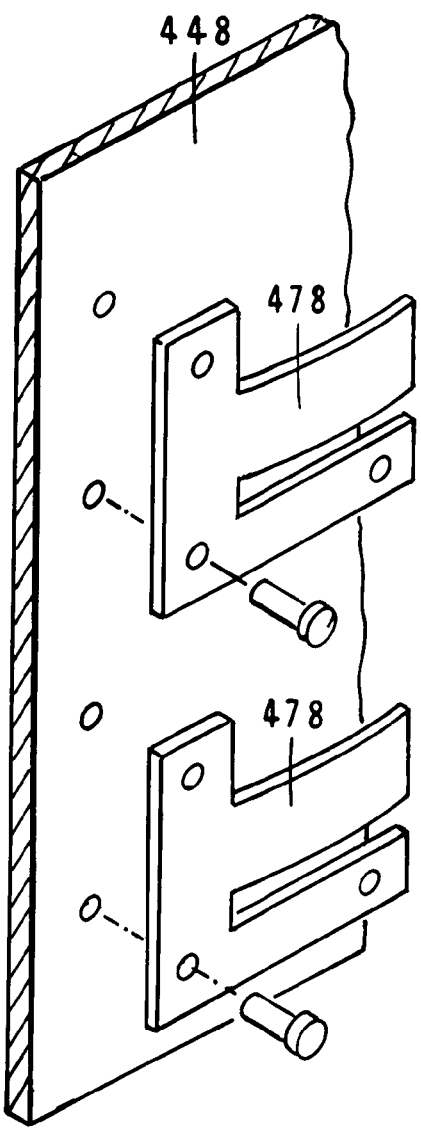
FIG. 28 is a fragmentary, generally perspective view of the second resistance imparting means of the invention for imparting resistance to the movement of the first and second head support panel assemblies of the apparatus.

As in the earlier described embodiment of the invention, the present form of the invention also includes means for imparting resistance to the movement of head rest assembly 426 upwardly and downwardly relative to connector member 422. This first resistance imparting means, which is substantially identical to that of the previously described embodiment, comprises a uniquely configured leaf spring designated in the drawings by the numeral 277. When the headrest assembly of the invention is fully assembled, central portion 277*c* of the spring is in pressural engagement with the front surface, or face, 445*a* of a Plastic film, or the like, guide insert 445 (FIG. 26). With this construction, as the headrest assembly is moved upwardly and downwardly spring 277 will yieldably resist vertical sliding movement of headrest assembly 426 relative to elongated guide 440 and seat connector member 422.

Figure 27:
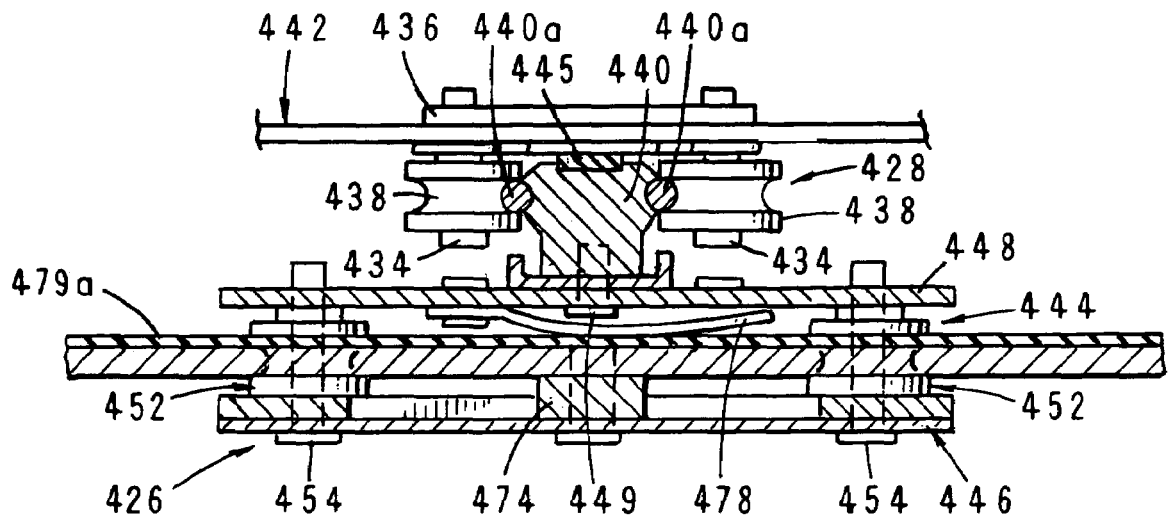
FIG. 27 is a cross-sectional view taken along lines 27-27 of FIG. 25.
Figure 29:
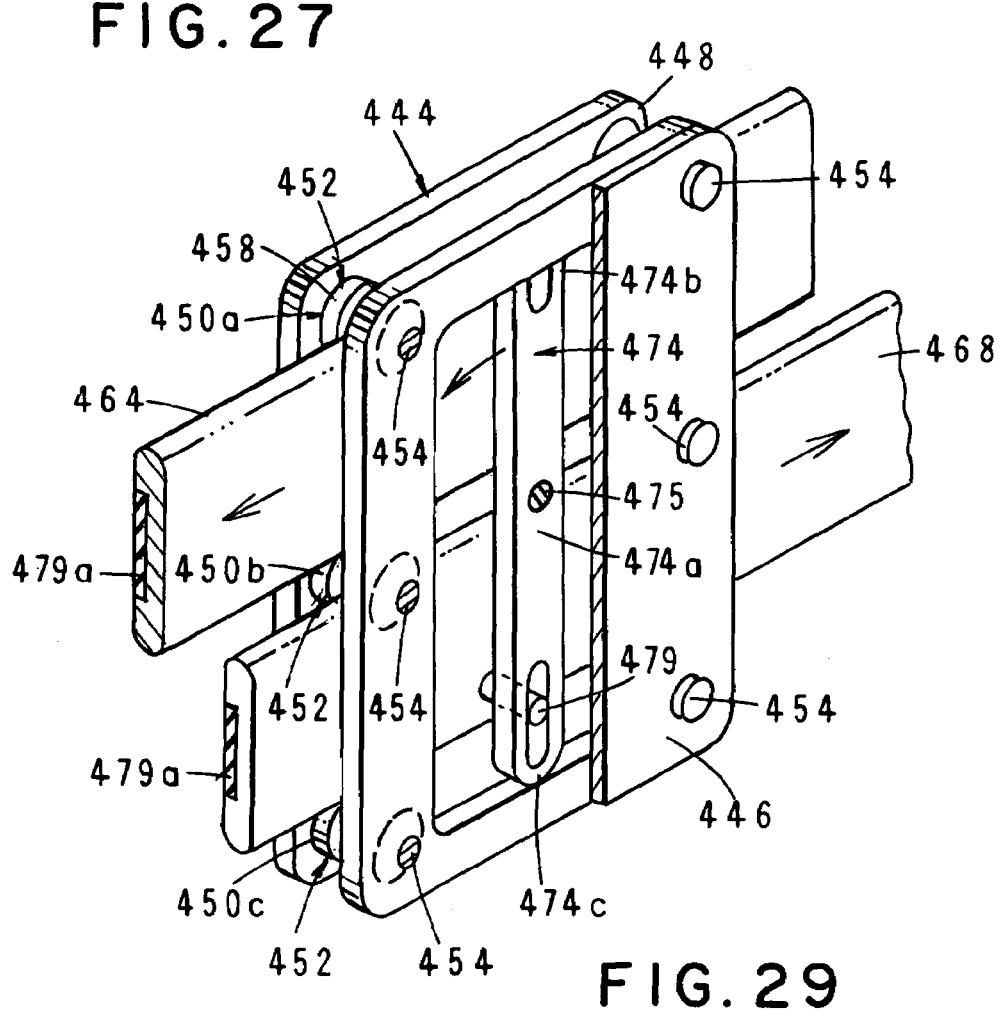
FIG. 29 is a fragmentary, generally perspective view of the second roller module of the apparatus that permits smooth horizontal sliding of the head support panel assemblies illustrating the manner of interconnection of the connector link with the first and second head support panel assemblies.

Referring particularly to FIG. 27, second roller module 444 can be seen to comprise a front plate, or head support panel 446 and a spaced-apart back plate 448 to which elongated guide 440 is connected by connectors 449. Disposed between plates 446 and 448 are first, second and third vertically spaced-apart sets of rollers 450a, 450b and 450c respectively. Each set of rollers includes two horizontally spaced-apart roller assemblies 452, which are of identical construction. Each spaced-apart roller assembly 452 includes a connecting shaft 454 that extends through plates 446 and 448 (FIGS. 27 and 29). Each of the roller assemblies 452 also includes a grooved roller 458 that is rotatably mounted on shaft 454.

Figure 25:
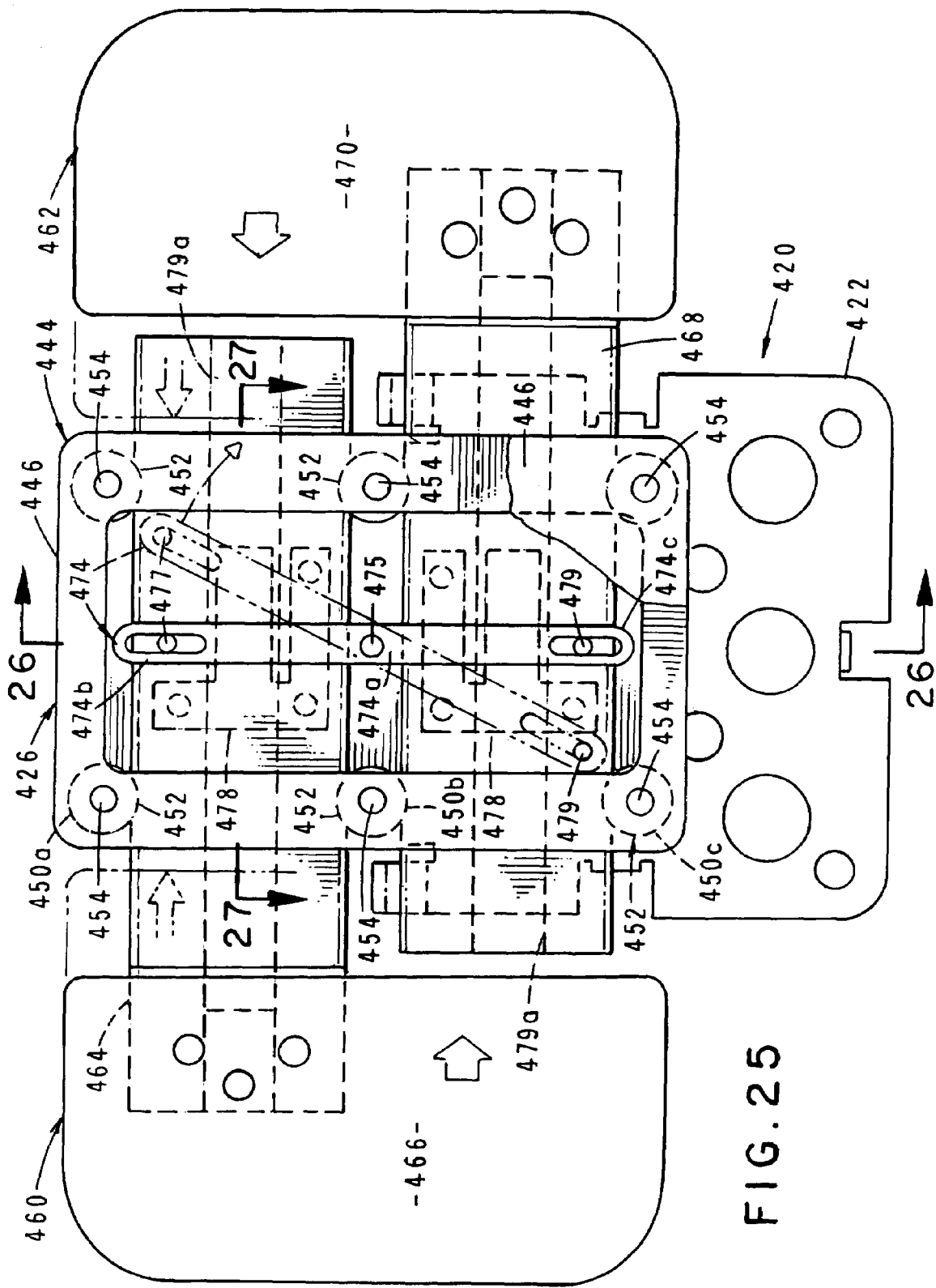
FIG. 25 is a cross-sectional view taken along lines 25-25 of FIG. 18.

Connected to second roller module 444 for transverse movement relative thereto between a first position shown in FIG. 17 and a second position shown in FIG. 25 is a first head support panel assembly 460. Also connected to second roller module 444 for transverse movement relative thereto between a first position shown in FIG. 17 and a second position shown in FIG. 25 is a second head support panel assembly 462. As best seen in FIGS. 17 and 20, first head support panel assembly 460 comprises a first slide rail 464 and a first side panel 466 pivotally connected to the first slide rail. Similarly, second head support panel assembly 462 comprises a second slide rail 468 and a second side panel 470 pivotally connected to the second slide rail. Interconnecting first and second head support panel assemblies 460 and 462 is a connector link 474. As indicated in FIG. 17, connector link 474 has a central portion 474a that is pivotally connected to front plate, or head support panel 446 by a connector 475, a first end portion 474b that is pivotally connected to first head support panel assembly 460 by a connector 477 and a second end portion 474c that is pivotally connected to second head support panel assembly 462 by a connector 479. With the construction thus described, first head support panel assembly 460 can be controllably rolled along first and second vertically spaced-apart roller sets 450a and 450b between their first extended position (FIG. 17) and their second retracted position (FIG. 25). Similarly, second head support panel assembly 462 can be controllably rolled along second and third vertically spaced-apart roller sets 450b and 450c between their first extended position (FIG. 17) and their second retracted position (FIG. 25). Because the first and second head support panel assemblies are uniquely interconnected by connector link 474, movement of one of the head support panel assemblies will cause the simultaneous movement of the second head support panel assembly.

This latest form of the invention also includes second resistance imparting means for imparting resistance to the movement of the first and second head support panel assemblies from side to side relative to the second roller module 444. This resistance imparting means here comprises a pair of uniquely configured leaf springs designated in FIGS. 27 and 28 of the drawings by the numeral 478. When the headrest assembly of the invention is fully assembled, the central portion of the springs are in pressural engagement with the faces, 479a of a Plastic film, or the like, inserts carried by the rear surfaces of the first and second slide rails 464 and 468 (FIG. 19). With this construction, springs 478 will yieldably resist sliding movement of the first and second head support panel assemblies from side to side relative to the second roller module 444 in a manner to permit assemblies.

As previously mentioned and smooth horizontal sliding of the head support panel as illustrated in FIG. 19, first and second side panels 466 and 470 are pivotally connected to the first and second slide rails for movement between a first position wherein they are substantially co-planar with central support panel 446 to a second angularly extending forward position shown by phantom lines in FIG. 19. Side panels 466 and 470 are preferably pivotally connected to the slide rails by means of a constant torque hinges, such as the previously described constant torque hinges 225. When side panels are pivoted into the angularly outwardly extending position, they provide a comfortable lateral support to the passenger's head in the manner previously described. This novel feature of the apparatus of the invention permits the user to slide the first and second side panels horizontally from side to side, to pivot the first and second side panels forwardly and then, if desired, to move the entire headrest assembly from a first lowered position to a second elevated position. In this way the user can achieve an optimum level of comfort.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A seat headrest for interconnection with a seat comprising:
   (a) a seat connector member connected to the seat;
   (b) a headrest assembly connected to said seat connector member, said headrest assembly comprising:
      (i) first, second and third vertically spaced-apart sets of rollers;
      (ii) a first head support panel assembly disposed between said first and second vertically spaced-apart sets of rollers for movement therealong between first and second positions; and
      (iii) a second head support panel assembly disposed between said second and third vertically spaced-apart sets of rollers for movement therealong between first and second positions.

2. The seat headrest as defined in claim 1 in which said headrest connector assembly comprises resistance imparting means for yieldably resisting movement of said first and second head support panel assemblies between said first and second positions.

3. The seat headrest as defined in claim 1 in which said headrest assembly further comprises an elongated guide for guiding the substantially vertical travel of said headrest assembly relative to said seat connector member between a first lowered position and second a elevated position.

4. The seat headrest as defined in claim 1 in which said first head support panel assembly comprises a first slide rail and a first side panel pivotally connected to said first slide rail and in which said second head support panel assembly comprises a second slide rail and a second side panel pivotally connected to said second slide rail.

5. The seat headrest as defined in claim 4, further including a connector link interconnecting said first and second head support panel assemblies.

6. A seat headrest for interconnection with a seat comprising:
   (a) a seat connector member connected to the seat;
   (b) a first roller module connected to said seat connector member, said first roller module comprising an elongated guide;

(c) a second roller module connected to said elongated guide of said first roller module, said second roller module comprising:
   (i) first, second and third vertically spaced-apart sets of rollers;
   (ii) a first head support panel assembly disposed between said first and second vertically spaced-apart sets of rollers for movement therealong between first and second positions; and
   (iii) a second head support panel assembly disposed between said second and third vertically spaced-apart sets of rollers for movement therealong between first and second positions.

7. The seat headrest as defined in claim 6 in which said first roller module comprises first and second spaced-apart sets of rollers in rollable engagement with said elongated guide for guiding the substantially vertical travel of said second roller module relative to said seat connector member between a first lowered position and second a elevated position.

8. The seat headrest as defined in claim 7 in which said first roller module further comprises a first resistance imparting means for yieldably resisting movement of said second roller module between said first lowered position and said second a elevated position.

9. The seat headrest as defined in claim 8 in which first resistance imparting means comprises a spring in compressive engagement with said elongated guide.

10. The seat headrest as defined in claim 8 in which said first head support panel assembly comprises a first slide rail and a first side panel pivotally connected to said first slide rail and in which said second head support panel assembly comprises a second slide rail and a second side panel pivotally connected to said second slide rail.

11. The seat headrest as defined in claim 10, further including a connector link interconnecting said first and second head support panel assemblies.

12. The seat headrest as defined in claim 11 in which said second roller module comprises a front plate and a spaced-apart back plate connected to said elongated guide, said first, second and third vertically spaced-apart sets of rollers being disposed between said front plate and back plates.

13. The seat headrest as defined in claim 12 in which said connector link has a central portion pivotally connected to said front plate, a first end portion pivotally connected to said first slide rail and a second end portion pivotally connected to said second slide rail.

14. The seat headrest as defined in claim 13 in which each set of first, second and third vertically spaced-apart sets of rollers includes two horizontally spaced-apart roller assemblies of identical construction.

15. The seat headrest as defined in claim 14 in which each of said spaced-apart roller assemblies includes:
   (a) a connecting shaft that extends through said front and back plates; and
   (b) a grooved roller that is rotatably mounted on said shaft.

16. A seat headrest for interconnection with a seat comprising:
   (a) a seat connector member connected to the seat; and
   (b) a first roller module connected to said seat connector member, said first roller module comprising:
      (i) an elongated guide; and
      (ii) first and second spaced-apart sets of rollers in rollable engagement with said elongated guide; and
   (c) a second roller module connected to said elongated guide of said first roller module, said second roller module comprising:
      (i) a front plate;
      (ii) a back plate spaced-apart from said front plate and connected to said elongated guide;
      (iii) first, second and third vertically spaced-apart sets of rollers connected to and disposed between said front plate and said back plate;
      (iv) a first head support panel assembly disposed between said first and second vertically spaced-apart sets of rollers for movement therealong between first and second positions; and
      (v) a second head support panel assembly disposed between said second and third vertically spaced-apart sets of rollers for movement therealong between first and second positions.

17. The seat headrest as defined in claim 16 in which said first head support panel assembly comprises a first slide rail and a first side panel pivotally connected to said first slide rail and in which said second head support panel assembly comprises a second slide rail and a second side panel pivotally connected to said second slide rail.

18. The seat headrest as defined in claim 17 in which said second roller module further comprises a connector link interconnecting said first and second head support panel assemblies.

19. The seat headrest as defined in claim 18 in which said connector link has a central portion pivotally connected to said front plate, a first end portion pivotally connected to said first slide rail and a second end portion pivotally connected to said second slide rail.

20. The seat headrest as defined in claim 19 in which said second roller module further comprises resistance imparting means for yieldably resisting movement of said first and second head support panel assemblies between said first and second positions.

* * * * *